United States Patent
Fourcault et al.

(10) Patent No.: US 9,252,553 B2
(45) Date of Patent: Feb. 2, 2016

(54) OPTICAL FIBER LASER AND METHOD FOR MANUFACTURING AN OPTICAL FIBER LASER

(71) Applicant: COMMISSARIAT A L'ENERGIE ATOMIQUE ET AUX ENERGIES ALTERNATIVES, Paris (FR)

(72) Inventors: William Fourcault, Grenoble (FR); Bruno Charrat, Saint-Egreve (FR); Jean-Michel Leger, Villard-Bonnot (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/437,733

(22) PCT Filed: Oct. 22, 2013

(86) PCT No.: PCT/FR2013/052527
§ 371 (c)(1),
(2) Date: Apr. 22, 2015

(87) PCT Pub. No.: WO2014/064383
PCT Pub. Date: May 1, 2014

(65) Prior Publication Data
US 2015/0280387 A1   Oct. 1, 2015

(30) Foreign Application Priority Data
Oct. 22, 2012   (FR) ...................... 12 60034

(51) Int. Cl.
*H01S 3/30*   (2006.01)
*H01S 3/067*   (2006.01)
(Continued)

(52) U.S. Cl.
CPC ............ *H01S 3/06704* (2013.01); *H01S 3/042* (2013.01); *H01S 3/0405* (2013.01);
(Continued)

(58) Field of Classification Search
CPC . H01S 3/06704; H01S 3/06708; H01S 3/067; H01S 3/0675; H01S 3/0933; H01S 3/0941; H01S 3/042; H01S 3/0405; H01S 3/06712; H01S 3/08031
USPC ................................................ 372/6, 71, 102
See application file for complete search history.

(56) References Cited

U.S. PATENT DOCUMENTS

| | | | | |
|---|---|---|---|---|
| 5,898,715 A | * | 4/1999 | LeGrange | G02B 6/262 372/6 |
| 2002/0181908 A1 | | 12/2002 | Pedersen et al. | |
| 2004/0057471 A1 | | 3/2004 | Shevy et al. | |
| 2009/0067453 A1 | * | 3/2009 | Mizuuchi | H01S 3/0602 372/6 |
| 2011/0110625 A1 | * | 5/2011 | Chatigny | G02B 6/3636 385/29 |

FOREIGN PATENT DOCUMENTS

| WO | 2012/044290 A1 | 4/2012 |
|---|---|---|
| WO | 2012/098835 A1 | 7/2012 |

OTHER PUBLICATIONS

H. Y. Kim, et al., "Polarization properties of a twisted fiber laser", Optics Letters, vol. 20, No. 4, pp. 386-388, (Feb. 15, 1995), XP055055775.

(Continued)

*Primary Examiner* — Kinam Park
(74) *Attorney, Agent, or Firm* — Oblon, McClelland, Maier & Neustadt, L.L.P.

(57) ABSTRACT

A laser includes an optical fiber having two ends of which a first end is configured to receive light therethrough, and a doped section configured to absorb at least part of the light received by the first end and for emitting light. The laser further includes a heat-conducting material which coats at least the doped section of the optical fiber.

9 Claims, 2 Drawing Sheets

Figure 1:
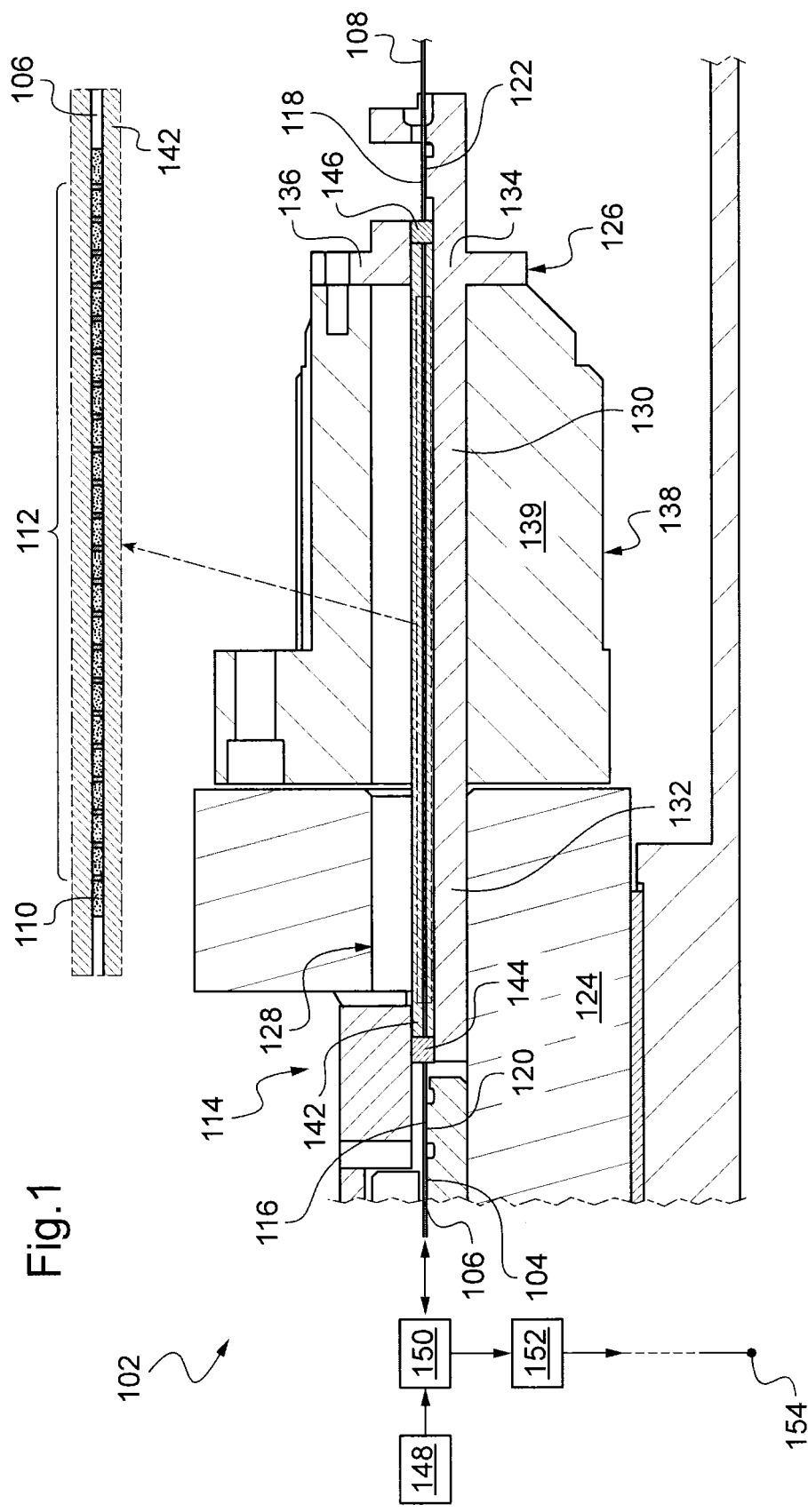

(51) Int. Cl.
*H01S 3/04* (2006.01)
*H01S 3/042* (2006.01)
*H01S 3/0933* (2006.01)
*H01S 3/0941* (2006.01)
*H01S 3/08* (2006.01)

(52) U.S. Cl.
CPC .............. *H01S 3/067* (2013.01); *H01S 3/0675* (2013.01); *H01S 3/06708* (2013.01); *H01S 3/0933* (2013.01); *H01S 3/0941* (2013.01); *H01S 3/06712* (2013.01); *H01S 3/08031* (2013.01); *Y10T 29/49826* (2015.01)

(56) References Cited

OTHER PUBLICATIONS

Wacker Chemie AG: "Technical Data Sheet for Wacker Silgel 612", pp. 1-3, (May 16, 2008), XP002721456.
Dr. W. Brennenstuhl: Wacker SilGel 612—Hardness f(mixing ratio), Total 1 Page, (Apr. 4, 2005), XP002721457.
International Search Report Issued Apr. 2, 2014 in PCT/FR13/052527 Filed Oct. 22, 2013.
French Search Report Issued Sep. 20, 2013 in French Application No. 12 60034 Filed Oct. 22, 2012.

* cited by examiner

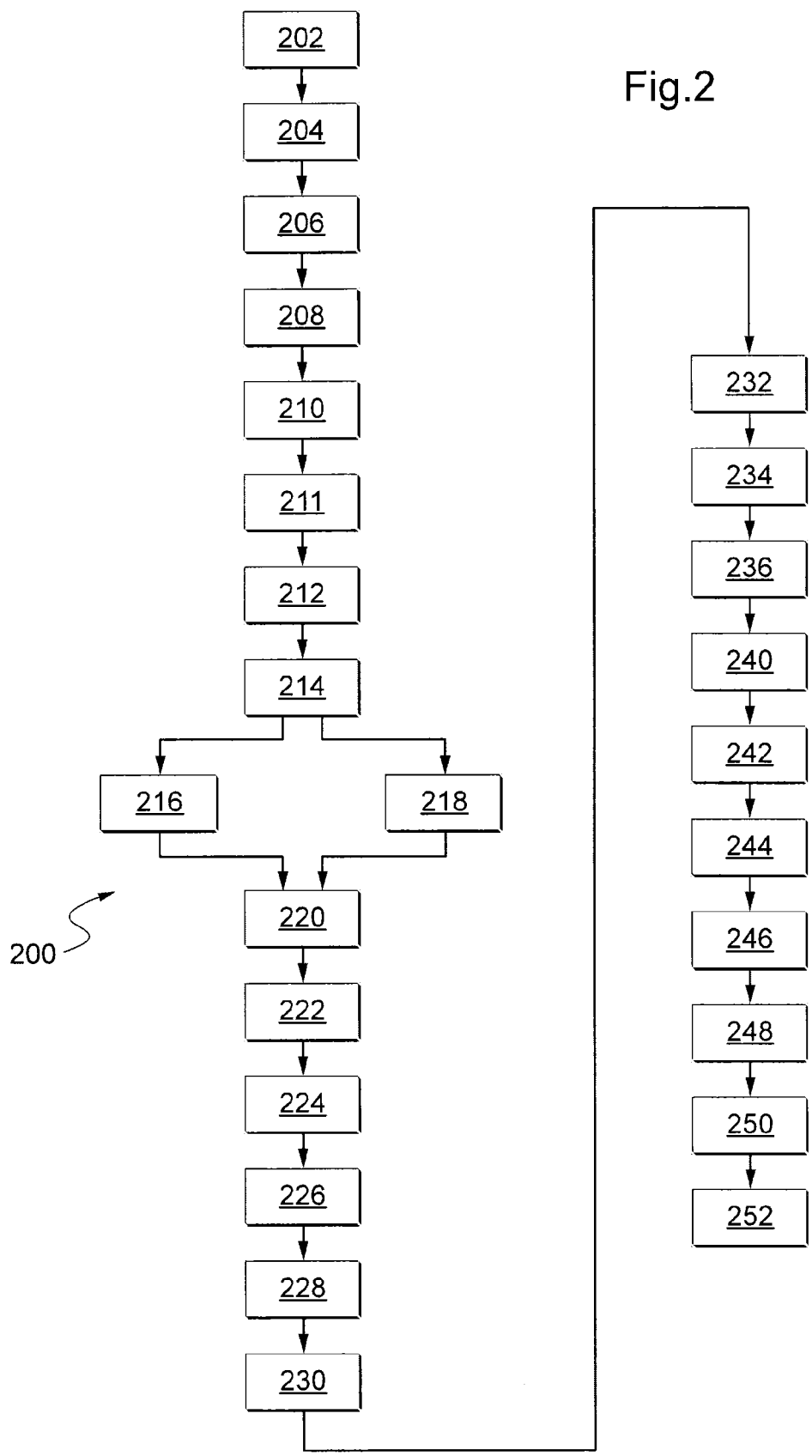

OPTICAL FIBER LASER AND METHOD FOR MANUFACTURING AN OPTICAL FIBER LASER

This invention relates to an optical fiber laser and a method for manufacturing an optical fiber laser.

The invention relates more particularly, but not exclusively, to the field of distributed feedback lasers (abbreviated as DFL) or distributed Bragg reflector (abbreviated as DBR) lasers, intended to operate at ambient pressure or in a vacuum, as is the case for example for space applications.

Publication no. US 2002/0181908 A1 of a patent application in the United States describes an optical fiber laser comprising an optical fiber having two ends of which a first end which is intended for receiving light therethrough, and a doped section intended for absorbing at least part of the light received by the first end and for emitting light.

The inventors have noted that, under certain conditions, such an optical fiber laser could have an unstable behavior characterized by a drop in the optical power at the output of the laser and a substantial increase in the wavelength of the light beam at the output of the laser.

It can therefore be sought to provide an optical fiber laser which makes it possible to overcome at least one portion of the aforementioned problems and constraints.

An object of the invention is therefore an optical fiber laser comprising:
an optical fiber having:
two ends of which a first end which is intended for receiving light therethrough, and
a doped section intended for absorbing at least part of the light received by the first end and for emitting light,
a heat-conducting material which coats at least the doped section of the optical fiber.

Indeed, the inventors have found that this problem of instability came from the heating of the optical fiber on the doped section. This heating is produced when the optical fiber laser is used in air at atmospheric pressure, but with a limited importance as the heat produced within the optical fiber is dissipated firstly by conduction, and secondly by convection in the air, and, to a lesser degree, by radiation. However, when the optical fiber laser is used in a vacuum, only the dissipation by radiation and the conduction along the optical fiber are possible, which can be insufficient when the light power supplied by the diode, called pump power, is high, for example higher than a few tens of milliwatts, and when the length of the doped section of the optical fiber does not exceed a few centimeters, according to the desired performance of the optical fiber laser.

On the contrary, in an optical fiber laser according to the invention, the heat-conducting material allows for a dissipation of the heat produced in the optical fiber, which renders the behavior of the optical fiber laser more stable.

Optionally, the heat-conducting material has a heat conductivity of at least 0.1 W·m-1·K-1, and more preferably of at least 0.2 W·m-1·K-1.

Optionally, the heat-conducting material has a hardness less than 20 Shore A.

Optionally, the heat-conducting material is polymerized and has a viscosity before polymerization less than 4 Pa·s, preferably less than 3 Pa·s.

Optionally, the optical fiber further has one or several Bragg networks, with the Bragg network or networks intended for filtering the light emitted by the doped section in order to allow only a portion having a predetermined wavelength to pass.

Optionally, the optical fiber laser further comprises a mechanical support to which the optical fiber is fixed in two fastening points located on either side of the doped section.

Optionally, the mechanical support comprises a gutter filled with the heat-conducting material and wherein the optical fiber, and in particular its doped section, extends.

Optionally, the mechanical support further comprises: a first portion to which one of the fastening points of the optical fiber is fastened; a second portion to which the other of the fastening points of the optical fiber is fastened; the first and second portions of the mechanical support being mobile in relation to one another and intended to be separated from one another in such a way as to tighten or loosen the optical fiber between the fastening points; and a spreading device intended for defining the separation between the first and second portions of the mechanical support.

Optionally, at least part of the light emitted by the doped section of the optical fiber is intended to exit by the first end of the optical fiber, and the optical fiber laser further comprises: a diode intended for emitting light intended for the first end of the optical fiber; and an optical multiplexor comprising an input through which the optical multiplexor is intended for receiving the light emitted by the diode, an input/output intended for transmitting the light coming from the diode to the first end of the optical fiber, and for receiving the light exiting from the first end of the optical fiber, and an output intended for transmitting the light received by the input/output of the optical multiplexor coming from the first end of the optical fiber.

Another object of the invention is a method for manufacturing an optical fiber laser according to the invention, comprising: the coating of the doped section of the optical fiber by a heat-conducting material.

Optionally, the method further comprises: the application of an angle of twist to the optical fiber; the supply of light having a power called pump power to the first end of the optical fiber; the verification that the Polarization Extinction Ratio of the light exiting the first end of the optical fiber remains higher than a predetermined value over an entire predetermined interval of the pump power; and, if the Polarization Extinction Ratio remains higher than the predetermined value over the entire predetermined interval of the pump power, the fastening of the optical fiber to the mechanical support at two fastening points of the optical fiber located on either side of the doped section, with the angle of twist applied to the optical fiber.

Indeed, the inventors have noted that certain known optical fiber lasers sometimes have unstable behavior characterized by a change over time of the direction of polarization of the light beam at the output of the laser.

The inventors have found that this problem of instability came from the method for manufacturing the optical fiber laser. Indeed, in the usual method of manufacturing, a point of operation determined primarily par the angle of twist is sought in accordance with the specifications set and the optical fiber is glued in this position. However, the inventors have determined that the slightest modification in the pump power could result in a shift in the point of operation, and therefore the instability described hereinabove.

Thanks to the method of the invention, it is verified that the output of the optical fiber remains well polarized over the entire range of pump power, not for a single value. As such, when the optical fiber laser is used with a nominal pump power within the preceding range, the polarization at the output of the laser remains stable even in the case of a fluctuation in the pump power around its nominal value.

The invention shall be better understood using the following description, provided solely as an example and made in reference to the annexed drawings wherein:

FIG. 1 diagrammatically shows the general structure of an optical fiber laser according to an embodiment of the invention, FIG. 2 shows the successive steps of a method for manufacturing the optical fiber laser of FIG. 1 according to an embodiment of the invention.

In reference to FIG. 1, an optical fiber laser 102 implementing the invention shall now be described. In the example described, the laser 102 is a longitudinal single-mode laser.

The laser 102 first comprises an optical fiber 104. The optical fiber 104 has, as is known per se, a core and an optical cladding surrounding the core, with the refractive index of the optical cladding being lower than that of the core. The core and the optical cladding are surrounded by a protective casing. The optical fiber 104 is provided with two ends 106, 108, of which a first end 106 is intended for the passing of light in the two directions of propagation: to and from the optical fiber 104. The optical fiber 104 has, between its two ends 106, 108, a doped section 110 intended, as is known per se, for absorbing at least part of the light received by the first end 106 of the optical fiber 104 and for emitting light, in particular in the direction of this first end 106, with the light emitted generally having a continuous range of wavelengths. The optical fiber 104 is for example doped with rare earth ions, such as erbium ($Er^{3+}$), neodymium ($Nd^{3+}$), ytterbium ($Yb^{3+}$), thulium ($Tm^{3+}$), or praseodymium ($Pr^{3+}$).

The optical fiber 104 further comprises a Bragg network 112 located in the example described in the doped section 110 and formed of variations in the reflective index of the core along the optical fiber 104. The Bragg network 112 is intended to filter the light emitted by the doped section 110 in order to allow only a portion having a predetermined wavelength to pass. As such, when the light received by the end 106 has a wavelength of 980 nm, the light emitted by the doped section has a range of wavelengths extending around 1,050 nm, and the light exiting by this end 106 has a wavelength in this range, between 1,000 and 1,100 nm according to the pitch of the Bragg network, for example 1,083 nm in the example described.

Alternatively, two Bragg networks located on either side of the doped section could be used instead of the Bragg network 112.

The laser 102 further comprises a mechanical support 114 to which the optical fiber 104 is fastened at two fastening points 116, 118 located on either side of the doped section 110. On the other hand, in the example described, the optical fiber 104 is not fastened to the mechanical support 114 between the two fastening points 116, 118. The fastening point 116 located on the side of the end 106 of the optical fiber 104 is called "proximal fastening point", while the other 118 is called "distal fastening point". The mechanical support 114 maintains the optical fiber 104 tight and in torsion between the two fastening points 116, 118. In the example described, the fastening points 116, 118 are separated by at least 6 cm.

The mechanical support 114 is formed of several parts fixed to each other, for example by gluing. These parts can expand together or independently of each other according to the temperature. In what follows, in order to simplify the description, only the large assemblies shall be described, not the details of the parts fastened together.

As such, in order to fasten the fastening points 116, 118, in the example described, the mechanical support 114 comprises a first portion 124 to which the proximal fastening point 116 is fastened, and a second portion 126 to which the distal fastening point 118 is fastened. The parties 124, 126 of the mechanical support 114 are mobile in relation to one another in such a way as to be separated from one another in order to tighten or loosen the optical fiber 104 between the fastening points 116, 118. In the example described, the fastening points 116, 118 are glued to the mechanical support 114 on respectively two gluing zones 120, 122, qualified respectively as proximal and distal.

The first portion 124 of the mechanical support 114 is pierced by an opening 128.

The second portion 126 of the mechanical support 114 comprises a gutter 130 having a first end 132 through which the gutter 130 is inserted into the opening 128, and a second end 134 provided with a shoulder 136. The optical fiber 104, and in particular the doped section 110, extends in the gutter 130.

The mechanical support 114 further comprises a spreading device 138 intended for defining the separation between the first and second portions 124, 126 of the mechanical support 114. In the example described, the spreading device 138 comprises a piezoelectric spacer 139 inserted between the first portion 124 of the mechanical support 114 and the shoulder 136 of the second portion 126 of the mechanical support 114. The spreading device 138 is intended to offset the dilatations of the parts of the laser 102 so that the Bragg network 112 retains a constant pitch over the course of time when the laser 102 is in an environment wherein the temperature can vary over time.

The mechanical support 114 further comprises a heat-conducting material 142 that fills the gutter 130 in such a way as to coat the portion of the optical fiber 104 extending in the gutter 130, and therefore in particular the doped section 110. This means that, in the gutter 130, the optical fiber 104 is embedded in the mass of the heat-conducting material 142. As such, all of the outside surface of the doped section 110 is in direct contact with the heat-conducting material 142, which facilitates the exchange of heat from the doped section 110 to the heat-conducting material 142.

In order to further encourage the exchange of heat, the heat-conducting material 142 has more preferably a heat conductivity of at least 0.1 $W \cdot m^{-1} \cdot K^{-1}$, for example of at least 0.2 $W \cdot m^{-1} \cdot K^{-1}$.

Preferably, the heat-conducting material 142 is devoid of air bubbles. Indeed, the presence of air bubbles would hinder and disturb the thermal dissipation, thus allowing a temperature gradient to appear which would result in a non-homogeneous Bragg network 112 and therefore a potentially unstable wavelength at the output of the laser 102.

Preferably, the heat-conducting material 142 is soft, i.e. it has a hardness less than 20 Shore A. Also preferably, the heat-conducting material 142 is ductile, i.e. it is able to be deformed without breaking. As such, being soft and ductile, the heat-conducting material 142 allows the doped section 110 to contract and to be drawn according to the environment of the laser 102.

Also preferably, the heat-conducting material 142 is sticky. As such, the heat-conducting material 142 remains more easily in place during the service life of the laser 102.

In the example described, the heat-conducting material 142 was polymerized after having been introduced into the gutter 130.

Preferably, the heat-conducting material 142 has a viscosity before polymerization less than 4 Pa·s, preferably less than 3 Pa·s. As such, when introduced into the gutter 130, the heat-conducting material 142 is sufficiently fluid to reduce the risk of the formation of air bubbles.

Preferably, the heat-conducting material 142 is a polymerized silicone gel, for example the gel sold under the reference CV-8151 by the company NuSil Silicone Technology. This gel can be manipulated for 30 hours once it is taken out of its original container, which avoids time constraints during the manufacture of the laser 102.

The laser 102 further comprises two caps 144, 146 that close the gutter 130 on each side so as to contain the heat-conducting material 142 in the gutter 130. In the example described, the caps 144, 146 are made of grease, for example of the MAPSIL210 type, or of a flexible glue, for example of the CV1-1142 silicone glue type.

The laser 102 further comprises a diode 148 intended for emitting light. The light emitted by the diode 148 has a main wavelength, of 980 nm in the example described and a light output, called pump power. In the example described, the diode 148 is supplied with a voltage and a current, called pump current, controlled in such a way as to be able to have different values. The pump power depends on the pump current and it is sufficient to modify the latter in order to modify the pump power.

The laser 102 further comprises an optical multiplexor 150 that first has an input intended for receiving the light emitted by the diode 148. The multiplexor 150 furthermore has an input/output intended for transmitting the light received from the diode 148 to the end 106 of the optical fiber 104, and for receiving the light exiting from the end 106 of the optical fiber 104. In the example described, the outgoing light has a wavelength of 1,083 nm. This shift in the wavelength allows the optical multiplexor 150 to separate the light coming from the optical fiber 104 from the light coming from the diode 148. The optical multiplexor 150 furthermore has an output, different from its input, intended for transmitting the light received on its input/output, i.e. coming from the end 106 of the optical fiber 104.

The laser 102 further comprises an optical isolator 152 that has an input intended for receiving the light emitted by the output of the multiplexor 150, and an output for transmitting this light to an output 154 of the laser 102. The optical isolator 152 has for function to allow for the propagation of the light from its input to its output, but to prevent the propagation of the light from its output to its input.

In reference to FIG. 2, a method 200 for manufacturing the laser 102 of FIG. 1 shall now be described.

During a step 202, the mechanical support 114 is subjected to at least one thermal cycle, i.e. to a temperature that varies between a predetermined low temperature, more preferably less than 0° C., for example −20° C., and a predetermined high temperature, more preferably greater than 30° C., for example 60° C. Preferably, the variation in temperature is carried out in dry air, i.e. with a relative humidity less than 10%, more preferably less than 5%. This step makes it possible to stabilize the mechanical support 114, i.e. to prevent the parts of the mechanical support 114 from being displaced later in relation to one another. Such a displacement could indeed be detrimental to the proper operation of the laser 102. For example, a displacement as low as 1 μm could result in a shift in the wavelength of the laser 102 by about ten picometers.

During a step 204, the diode 148 is connected to the optical fiber 104 in such a way that the latter can receive the light emitted by the diode 148. As such, in the example described, this means that the end 106 of the optical fiber 104 is welded to the input/output of the optical multiplexor 150, and the input of the latter is connected to the output of the diode 148.

During a step 206, the optical fiber 104 is placed in the mechanical support 114, in particular in such a way that the doped section 110 is located in the gutter 130 and centered in the latter. The optical fiber 104 is not however fastened to the mechanical support 114 at this stage. Magnetic jaws not shown and located on either side of the doped section 110 of the optical fiber 104 are then closed on the optical fiber 104 in order to maintain the latter in position, in particular in the gutter 130 of the mechanical support 114. The magnetic jaws are as such located on either side of the doped section 110 of the optical fiber 104 and are generally separated from each other by at least 30 cm.

During a step 208, the diode 148 is lit by supplying it with the pump current is such way that it emits light that arrives to the optical fiber 104, with the doped section 110 of the latter then being pumped until a desired nominal power is obtained at the output of the optical multiplexor 150.

During a step 210, the optical fiber 104 is progressively tightened by separating the magnetic jaws from one another until a desired wavelength is obtained at the output of the optical multiplexor 150.

During a step 211, the Polarization Extinction Ratio (or PER), at the output of the end 106 of the optical fiber 104 is evaluated and compared with a predetermined value, for example 15 dB. In the example described, this evaluation is carried out by measuring the PER at the output of the optical multiplexor 150, as the latter does not change the polarization of the light beam. As is known per se, the PER makes it possible to quantify the rate of polarization of the light beam.

If the PER is less than the predetermined value, for example 15 dB, experience shows that the probability of finding a suitable and stable operating point with this optical fiber is low. It is then more preferable to return to the step 204 with another optical fiber.

During a step 212, a torsion is progressively applied to the optical fiber 104 between the two magnetic jaws 120, 122 according to an angle of twist. Preferably, the angle of twist is maintained under three turns. At the same time, the PER at the output of the end 106 of the optical fiber 104 is evaluated, still measuring it at the output of the optical multiplexor 150.

During a step 214, the angle of twist between the two magnetic jaws that offers the best PER, i.e. the highest, is determined. This angle of twist is called the "optimum angle of twist".

During a step 216, with the optical fiber 104 being maintained, thanks to the magnetic jaws, in the mechanical support 114 tightened and twisted at the optimum angle of twist, it is verified that the PER remains higher than a predetermined value, for example 15 dB, over a predetermined interval of the pump power, which reverts, in the example described, to a predetermined interval of the pump current. For this purpose, the pump current is controlled in such a way as to pass through the predetermined interval, while measuring the PER at the output of the end 106 of the optical fiber 104. Preferably, during the step 216, the predetermined interval of the pump current is passed through in stages, with a stage being defined in the example described as a duration of at least 30 s, more preferably of at least 60 s, during which the pump current is constant to within one percent around an average value. Also preferable, the stages are separated from each other by at most 10 mA, more preferably by at most 8 mA. Further preferably, the passing from one stage to the next is carried out at a speed of at most 10 mA·s$^{-1}$, and more preferably of at most 5 mA·s$^{-1}$.

If the PER falls below 15 dB in the predetermined interval of pump current, this means that the beam emitted by the end 106 of the optical fiber 104 is not well linear-polarized and that, if the optical fiber 104 were retained with this optimum angle of twist, there would be a risk of skipping a polarization mode for the laser 102. That is why, in this case, it is returned to the step 214, wherein the angle of twist that provides the following best PER is selected as an optimum angle of twist. Alternatively, it is returned to the step 202 with another optical fiber.

During a step 218, parallel to the step 216, it is verified that the output laser beam is still longitudinal single-mode, while the optical fiber 104 is tight and in torsion. A Fabry Perot interferometer is for example used to carry out this verification.

During a step 220, it is verified that the PER remains higher than the predetermined value over the predetermined interval of the pump current and that the output laser beam remains longitudinal single-mode for several angles of torsion between the two magnetic jaws, called secondary angles of torsion, belonging to a predetermined angular interval defined using the optimum angle of twist and comprising the optimal angle of twist. The predetermined angular interval is for example ±90° around the optimum angle of twist. Preferably, the secondary angles of torsion include at least the angles ±45° and/or ±90° in relation to the optimum angle of twist. For this purpose, the steps 216 and 218 are for example repeated for each of the second angles of torsion. If the verification is positive, this means that the optimum angle of twist does indeed define a stable operating point of the optical fiber 104.

During a step 222, the optical fiber 104 is removed from the mechanical support 114 and the points of the optical fiber 104 which were located, before its removal, facing the gluing zones 120, 122 are stripped (removal of the protective casing), in order to form fastening points 116, 118.

During a step 224, the optical fiber 104 is again placed in the mechanical support 114 as in the step 206, by placing the fastening points 116, 118 respectively against the gluing zones 120, 122.

During a step 226, the optimum angle of twist is applied to the optical fiber 104. The optical fiber 104 is again maintained in this position thanks to the magnetic jaws.

During a step 228, it is again verified that the PER remains higher than the predetermined value over the predetermined interval of the pump current and that the output laser beam remains longitudinal single-mode.

During a step 230, the distal fastening point 118 is glued to the distal gluing zone 122. The glue is for example a UV cross-linking epoxy glue.

During a step 232, while maintaining the optimum angle of twist, the optical fiber 104 is tightened, as in the step 210.

During a step 234, the proximal fastening point 116 is glued to the proximal gluing zone 120.

As the glue is applied directly onto the optical cladding, there is no risk of sliding with the protective casing.

During a step 236, the glue is left at rest for the time required for it to polymerize and stabilize.

During a step 240, the two caps 144, 146 are placed respectively at the ends of the gutter 130.

When it is grease, the two caps 144, 146 are more preferably observed at different angles using, possible, a binocular instrument, to see if they will be sealed from gel (hardly viscous). When it is grease, the caps 144, 146 are more preferably somewhat squeezed.

During a step 242, the portion of the optical fiber 104 extending in the gutter 130, between the two caps 144, 146, and therefore in particular the doped section 110, is coated with heat-conducting material 142 by filling the gutter 130 with heat-conducting material 142. The step 242 is carried out in such a way as to avoid the formation of air bubbles in the heat-conducting material 142 as much as possible.

In the example described, the step 242 comprises the following steps.

During a step 242-1, the mechanical support 114 is inclined on one side of one of the caps 144, 146. For example, the inclination is between 5° and 10° with respect to the horizontal. Also for example, the inclination is obtained using a wedge.

During a step 242-2, a small amount of heat-conducting material 142 is placed in a small container, in such a way as to be able to recover drops of it with the small needle.

During a step 242-3, the heat-conducting material 142 is delicately deposited, using the small needle, drop by drop, from the small container, into the gutter 130 until the heat-conducting material reaches the cap located at the bottom.

During a step 242-4, the mechanical support 114 is placed flat, in such a way that the optical fiber 104 extends horizontally. The flat placing is for example carried out using a spirit level.

During a step 242-5, drops of heat-conducting material are injected into the gutter 130 until the latter is filled, in particular until the conducting material reaches the other cap (the one located at the top when the gutter 130 was inclined).

In order to carry out the step 242, it is preferable to work in a clean environment, of the white room type, with a mob cap and gloves. The tools required to apply the gel, such as the syringe, the needle for depositing the drops of gel, the small containers, etc. are preferably cleaned with lint-free drying paper soaked in alcohol, for example isopropyl alcohol.

During a step 244, the heat-conducting material 142 is stabilized in the gutter 130 by leaving the mechanical support flat for a predetermined duration of at least 1 hour.

During a step 246, when the predetermined duration has elapsed, it is verified that the optical fiber 104 is well immersed in the heat-conducting material and that the latter has not flowed anywhere. If necessary, a few drops of heat-conducting material are added.

During a step 248, while the mechanical support 114 is still flat, the heat-conducting material 142 is polymerized. The polymerization is carried out, according to the type of heat-conducting material 142, in an oven or under ultraviolet or according to the suitable polymerization method.

During a step 250, it is verified that the heat-conducting material 142 is suitably polymerized. For example, the verification is carried out using a control pot that has undergone the same procedure of polymerization. It is also verified that the heat-conducting material 142 is present everywhere on the periphery of the optical fiber 104 in the gutter 130.

During a step 252, various operating tests of the laser 102 are carried out. These tests for example include one or several of the following tests: verification that the power at the output of the laser 102 varies according to the pump current according to a predetermined template, verification that the wavelength at the output of the laser 102 varies according to the pump current according to a predetermined template, verification that the PER varies according to the pump current according to a predetermined template, verification of the stability of the power at the output of the laser 102 during a predetermined duration of at least 1 hour.

It clearly appears that an optical fiber laser such as the one described hereinabove makes it possible to dissipate the heat produced in the optical fiber, towards the exterior of the latter. As such, a constant pitch of the Bragg network can be obtained along the optical fiber, which improves the spectral performance and the intensity of the laser.

It will be noted moreover that the invention is not limited to the embodiment described previously. It will appear indeed to those skilled in the art that diverse modifications can be made to the embodiment described hereinabove, using the information that has just been disclosed. In the claims that follow, the terms used must not be interpreted as restricting the claims to the embodiment exposed in this description, but must be interpreted in order to include therein all of the equivalents that the claims aim to cover due to their formulation and of which the foreseeing is within the scope of those skilled in the art by applying their general knowledge to the implementation of the information that has just been disclosed.

The invention claimed is:

1. An optical fiber laser comprising:
an optical fiber comprising:
two ends of which a first end is configured to receive light therethrough, and
a doped section configured to absorb at least part of the light received by the first end and for emitting light;
a heat-conducting material which coats at least the doped section of the optical fiber, with the heat-conducting material having a hardness less than 20 Shore A, and being polymerized and having a viscosity before polymerization less than 4 Pa·s, or less than 3 Pa·s.

2. The optical fiber laser according to claim 1, wherein the heat-conducting material has a heat conductivity of at least 0.1 W·m-1·K-1, or of at least 0.2 W·m-1·K-1.

3. The optical fiber laser according to claim 1, wherein the optical fiber further includes one or plural Bragg networks, with the Bragg network or networks configured to filter light emitted by the doped section to allow only a portion having a predetermined wavelength to pass.

4. The optical fiber laser according to claim 1, further comprising a mechanical support to which the optical fiber is fixed at two fastening points located on either side of the doped section.

5. The optical fiber laser according to claim 4, wherein the mechanical support comprises a gutter filled with the heat-conducting material and wherein the optical fiber, or its doped section, extends.

6. The optical fiber laser according to claim 4, wherein the mechanical support further comprises:
a first portion to which one of the fastening points of the optical fiber is fastened,
a second portion to which the other of the fastening points of the optical fiber is fastened;
the first and second portions of the mechanical support being mobile in relation to one another and configured to be separated from one another to tighten or loosen the optical fiber between the fastening points;
a spreading device configured to define the separation between the first and second portions of the mechanical support.

7. The optical fiber laser according to claim 1, wherein at least part of the light emitted by the doped section of the optical fiber can exit by the first end of the optical fiber, and further comprising:
a diode configured to emit light for the first end of the optical fiber; and
an optical multiplexor comprising:
an input through which the optical multiplexor is configured to receive the light emitting by the diode,
an input/output configured to transmit the light coming from the diode to the first end of the optical fiber, and to receive the light exiting the first end of the optical fiber, and
an output configured to transmit the light received by the input/output of the optical multiplexor coming from the first end of the optical fiber.

8. A method for manufacturing an optical fiber laser according to claim 1, comprising:
coating the doped section of the optical fiber by a heat-conducting material.

9. The method according to claim 1 for manufacturing an optical fiber laser, further comprising:
application of an angle of twist to the optical fiber;
supplying light that has a pump power to the first end of the optical fiber;
verification that the Polarization Extinction Ratio of the light exiting the first end of the optical fiber remains higher than a predetermined value over an entire predetermined interval of the pump power; and
if the Polarization Extinction Ratio remains higher than the predetermined value over the entire predetermined interval of the ump power, fastening the optical fiber to the mechanical support at two fastening points of the optical fiber located on either side of the doped section, with the angle of twist applied to the optical fiber.

* * * * *